United States Patent
Kim et al.

(10) Patent No.: US 8,547,933 B2
(45) Date of Patent: Oct. 1, 2013

(54) METHOD AND APPARATUS FOR PERFORMING HANDOVER IN MULTI-MODE TERMINAL

(75) Inventors: Il Hwan Kim, Seongnam-si (KR); Jae Cheon Kim, Anyang-si (KR); Mun Yong Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 361 days.

(21) Appl. No.: 12/944,633

(22) Filed: Nov. 11, 2010

(65) Prior Publication Data

US 2011/0110332 A1    May 12, 2011

Related U.S. Application Data

(60) Provisional application No. 61/260,013, filed on Nov. 11, 2009.

(30) Foreign Application Priority Data

Jul. 14, 2010    (KR) .......................... 10-2010-0067854

(51) Int. Cl.
*H04W 4/00*    (2009.01)
(52) U.S. Cl.
USPC ........... 370/331; 370/466; 370/467; 455/442; 455/437; 455/440

(58) Field of Classification Search
None
See application file for complete search history.

(56) References Cited

U.S. PATENT DOCUMENTS

| | | | | |
|---|---|---|---|---|
| 7,818,486 | B2* | 10/2010 | McLeod | 710/313 |
| 8,199,719 | B2* | 6/2012 | Taneja | 370/331 |
| 2007/0014260 | A1* | 1/2007 | Seo | 370/331 |
| 2007/0218903 | A1* | 9/2007 | Grech | 455/436 |
| 2010/0034181 | A1* | 2/2010 | Shinozaki | 370/338 |

* cited by examiner

*Primary Examiner* — Ian N Moore
*Assistant Examiner* — Latresa A McCallum
(74) *Attorney, Agent, or Firm* — Lee, Hong, Degerman, Kang & Waimey

(57) ABSTRACT

A method for performing handover in a dual-mode terminal is disclosed. The method for performing handover in a dual-mode terminal includes receiving an Internet Protocol (IP) packet from a personal computer (PC), and transmitting the received IP packet to a serving network; upon receiving a handover message from the serving network, stopping reception of the IP packet from the PC; forwarding residual packets from a first processor corresponding to the serving network to a second processor corresponding to a target network; upon handover completion and completion of the forwarding of the residual packets, restarting reception of the IP packet from the PC; and transmitting the residual packets to the target network.

7 Claims, 4 Drawing Sheets

METHOD AND APPARATUS FOR PERFORMING HANDOVER IN MULTI-MODE TERMINAL

CROSS-REFERENCE TO RELATED APPLICATIONS

Pursuant to 35 U.S.C. §119, this application claims the benefit of earlier filing date and right of priority to Korean Application No. 10-2010-0067854, filed on Jul. 14, 2010, and also claims the benefit of U.S. Provisional Application Ser. No. 61/260,013, filed on Nov. 11, 2009, the contents of which are all hereby incorporated by reference herein in their entirety.

BACKGROUND OF THE INVENTION

1. Field of the Invention

The present invention relates to a multi-mode device, and more particularly to a method and apparatus for forming handover in a multi-mode terminal.

2. Discussion of the Related Art

Wireless mobile communication technology is being rapidly developed not only in voice communication but also in high speed transmission/reception of data. Nowadays, a fourth generation mobile communication technology, for example, a Long Term Evolution (LTE) wireless communication system is a focus of attention. However, under the condition that a fourth generation communication network and a third generation communication network are present together, a mobile communication terminal or a mobile communication data card must include not only fourth generation mobile communication technology but also third generation mobile communication technology being widely used in the world. Therefore, in order to simultaneously support the next generation mobile communication technology and the legacy mobile communication technology, a mobile communication having different modems and processors and a data-card type dual-mode terminal are needed.

The dual-mode terminal includes two modems having different communication schemes so as to so that it can support different communication schemes using the two modems. Generally, the dual-mode terminals have been widely used in a region including heterogeneous communication networks. As representative examples of the dual-mode terminal, a Long Term Evolution (LTE) wireless communication device and a Wideband Code Divisional Multiple Access (WCDMA) communication device are being intensively researched by many developers and companies. Although the present invention will exemplarily disclose such a dual-mode terminal capable of communicating with all of LTE and CDMA networks, the scope or spirit of the present invention is not limited thereto and can also be applied to other wireless communication examples as necessary.

SUMMARY OF THE INVENTION

Accordingly, the present invention is directed to a method and apparatus for performing handover in a multi-mode terminal, that substantially obviate one or more problems due to limitations and disadvantages of the related art.

An object of the present invention is to provide a method and apparatus for performing handover in a multi-mode terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for performing handover in a dual-mode terminal includes receiving an Internet Protocol (IP) packet from a personal computer (PC), and transmitting the received IP packet to a serving network; upon receiving a handover message from the serving network, stopping reception of the IP packet from the PC; forwarding residual packets from a first processor corresponding to the serving network to a second processor corresponding to a target network; upon handover completion and completion of the forwarding of the residual packets, restarting reception of the IP packet from the PC; and transmitting the residual packets to the target network. The stopping of the IP packet reception may include storing the residual packets in the first processor.

The PC and the dual-mode terminal may be connected to each other through a Universal Serial Bus (USB). The stopping of the IP packet reception may include transmitting a USB negative acknowledgement (NACK) signal in response to a signal received from the PC. The restarting of the IP packet reception may include transmitting a USB acknowledgement (ACK) signal in response to a signal received from the PC.

The restarting of the IP packet reception may include, if handover is completed before completion of the forwarding of the residual packets, entering a standby mode until the forwarding of the residual packets is completed, and deleting the residual packets stored in the first processor.

In another aspect of the present invention, a multi-mode terminal includes: a first processor for communicating with a serving network; a second processor for communicating with a target network; and a multi-mode control module for controlling transmission and reception of an Internet Protocol (IP) packet among a personal computer (PC), the first processor and the second processor, wherein the multi-mode control module, upon receiving a handover message from the serving network, stops reception of the IP packet from the PC, the first processor forwards residual packets to the second processor, and the multi-mode control module, upon handover completion and completion of the forwarding of the residual packets, restarts reception of the IP packet from the PC. The first processor may store the residual packets if the reception of the IP packet from the PC is stopped.

The PC and the multi-mode terminal may be connected to each other through a Universal Serial Bus (USB). The multi-mode control module may transmit a USB negative acknowledgement (NACK) signal in response to a signal received from the PC so as to stop reception of the IP packet. The multi-mode control module may transmit a USB acknowledgement (ACK) signal in response to a signal received from the PC so as to restart the IP packet reception.

If handover is completed before completion of the residual packet forwarding, the first processor enters a standby mode until the forwarding of the residual packets is completed, and deletes the stored residual packets.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and be denoted in the form of a block diagram on the basis of the important functions of the present invention. Wherever possible, the same reference numbers will be used throughout the drawings to refer to the same or like parts.

In the following description, a terminal or device may refer to a mobile or fixed user equipment (UE), for example, a user equipment (UE), a mobile station (MS) and the like. Also, the base station (BS) may refer to an arbitrary node of a network end which communicates with the above terminal or device, and may include a Node B (Node-B), an eNode B (eNode-B), and an access point (AP) and the like.

For convenience of description and better understanding of the present invention, although the present invention will disclose a dual-mode terminal that includes two modems for different communication schemes in a single device, the dual-mode terminal is disclosed for only illustrative purposes and the following embodiments can also be applied to a multi-mode terminal that includes two or more modems for different communication schemes in one device.

Further, although the following embodiments assume that a multi-mode terminal can communicate with the LTE and WCDMA networks for convenience of description and better understanding of the present invention, the scope or spirit of the present invention is not limited thereto, the present invention may also be applied to other multi-mode terminals capable of communicating not only the LTE and WCDMA networks but also other heterogeneous networks.

Figure 1:
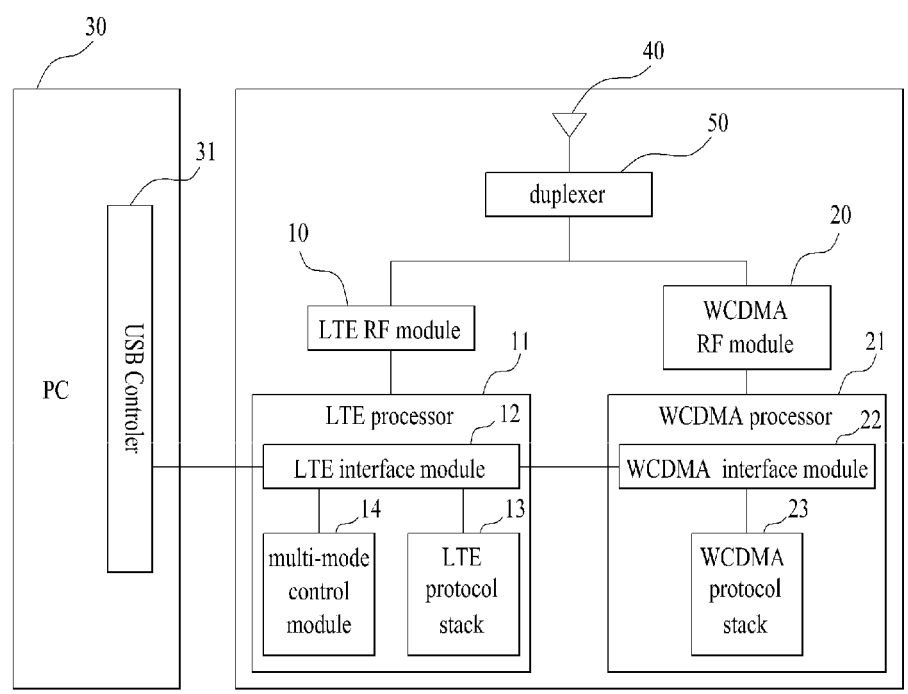
FIG. 1 is a block diagram illustrating a multi-mode terminal according to an embodiment of the present invention.

FIG. 1 is a block diagram illustrating a multi-mode terminal according to an embodiment of the present invention.

Referring to FIG. 1, a multi-mode terminal includes an LTE Radio Frequency (LTE RF) module 10 for transmitting and receiving RF signals to and from the LTE network; and an LTE processor 11 to perform a series of processes for transmitting and receiving signals to and from the LTE network. The multi-mode terminal further includes a WCDMA RF module 20 for transmitting and receiving RF signals to and from the WCDMA network; and a WCDMA processor 21 to perform a series of processes for transmitting and receiving signals to and from the WCDMA network.

The WCDMA processor 21 includes a WCDMA interface module 21 and a WCDMA protocol stack 22. In more detail, the WCDMA interface module 21 contained in the WCDMA processor includes all kinds of interfaces for communication, for example, Secure Digital Input Output (SDIC), Universal Asynchronous Receiver/Transmitter) (UART), and External Bus Interface (EBI). The WCDMA protocol stack 22 may perform a series of hardware or software functions for providing socket programming to communicate with a WCDMA network.

In addition, the LTE processor 11 includes an LTE interface module 12, a multi-mode control module 14, and an LTE protocol stack 13. In more detail, the LTE interface module 12 contained in the LTE processor includes all kinds of interfaces for communication, for example, Secure Digital Input Output (SDIO), Universal Asynchronous Receiver/Transmitter (UART), External Bus Interface (EBI), etc. In particular, the LTE interface module 12 contained in the LTE processor 11 provides a function for transmitting and receiving a signal to and from a personal computer (PC), and is connected to a USB controller 31 of the PC 30 through a Universal Serial Bus (USB) interface. In this way, the LTE protocol stack 13 may perform a series of hardware or software functions for providing socket programming to communicate with the LTE network.

In addition, the multi-mode control module 14 contained in the LTE processor 11 may control data communication (signal transmission/reception) between the LTE processor 11 and the WCDMA processor 21. Therefore, if data communication between the PC 30 and the WCDMA processor 21 is required, a signal from the PC 30 may be transmitted to the WCDMA processor 21 through the LTE processor 11. A signal from the PC 30 may be transmitted to the WCDMA processor 21 through the LTE processor 11. If necessary, the multi-mode terminal 14 may also be contained in the WCDMA processor 21. In this case, the WCDMA processor 21 may control data communication between the PC 30 and the multi-mode terminal.

In addition, the dual-mode terminal may include one antenna 40 to communicate with the LTE network or the WCDMA network. The antenna 40 may be connected to the LTE RF module 10 or the WCDMA RF module 20 through a switch (not shown) or a duplexer 50, etc.

Figure 2:
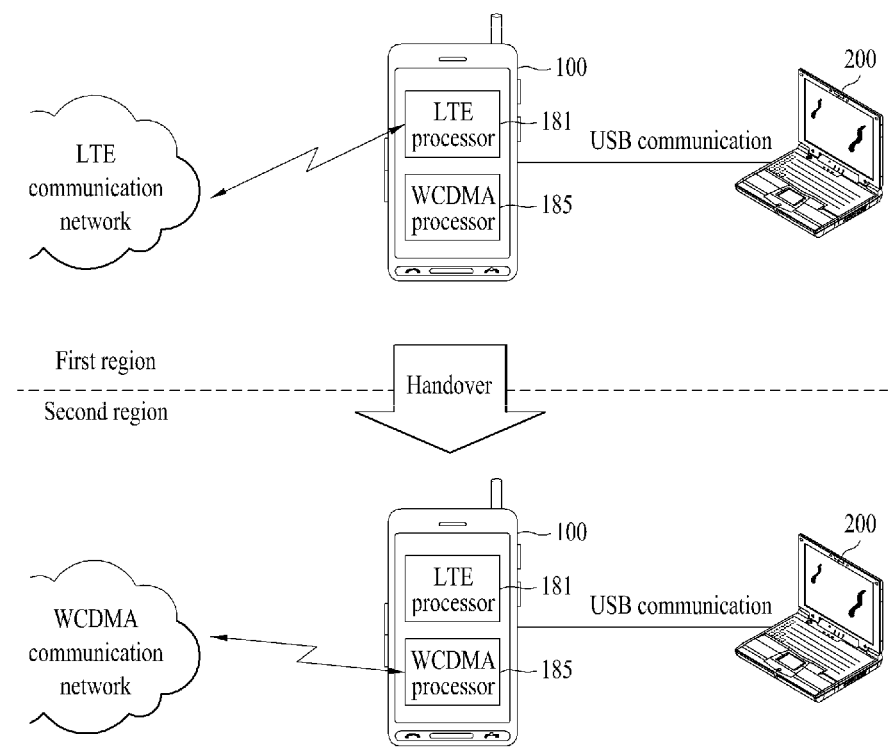
FIG. 2 is a conceptual diagram illustrating a handover process of a multi-mode terminal according to an embodiment of the present invention.

FIG. 2 is a conceptual diagram illustrating a handover process of a multi-mode terminal according to an embodiment of the present invention.

Referring to FIG. 2, the multi-mode terminal 100 may be connected to a PC 200 such as a laptop through USB communication. The multi-mode terminal 100 may be connected to the LTE communication network covering a first region through an LTE processor 181.

Therefore, the PC 200 may communicate with the LTE processor 181 of the multi-mode terminal 100 through USB communication, such that it can communicate with the LTE communication network through the LTE processor 181.

The multi-mode terminal 100 can move from a first region to a second region. In this case, the multi-mode terminal 100 is handed over from the first region to the second region, such that it can continuously communicate with the WCDMA communication network covering the second region through the WCDMA processor 185. That is, the LTE communication network is a serving network and the WCDMA communication network is a target network. When the multi-mode terminal 100 is handed over from the first region to the second region, the PC 200 needs to continuously communicate with the WCDMA communication network through the WCDMA processor 185 of the multi-mode terminal 100.

That is, when the multi-mode terminal 100 is handed over from the first region to the second region, the PC 200 needs to be transitioned from USB communication with the LTE processor 181 to USB communication with the WCDMA processor 185.

In addition, when the multi-mode terminal 100 is handed over from the second region to the first region, the PC 200 needs to be transitioned from USB communication with the WCDMA processor 185 to USB communication with the LTE processor 181.

Meanwhile, during handover, packets transmitted from the PC to the terminal (or device) may be lost in response to internal processing delay of the terminal or a network status caused by handover. That is, if the PC continuously transmits packets to the terminal (or device) on the condition that handover between the LTE processor and the WCDMA processor is not completed, the packets are lost, resulting in a reduction in overall throughput. In order to solve the above-mentioned problems, a method for processing handover in a multi-mode terminal according to the present invention will hereinafter be described with reference to the accompanying drawings.

Figure 3:
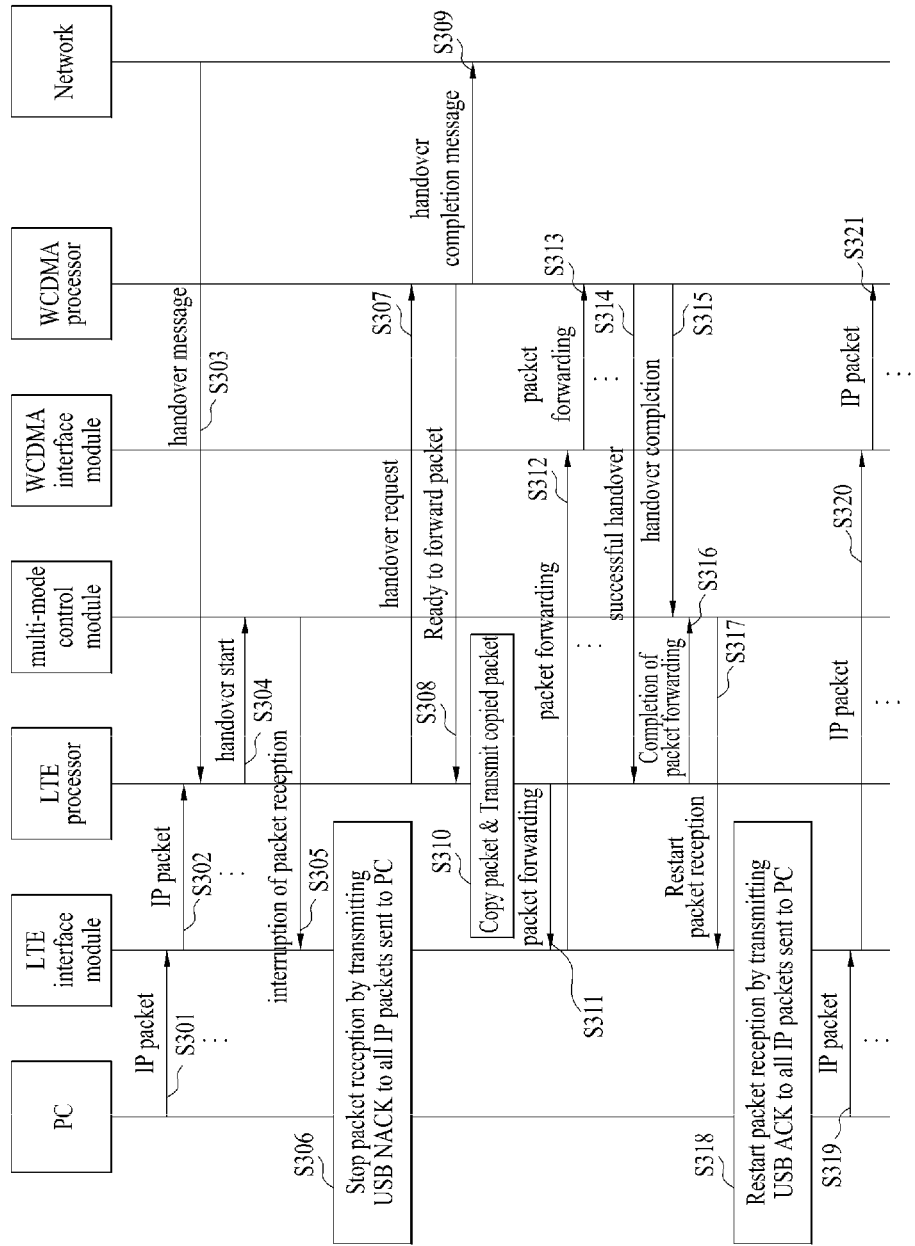
FIG. 3 is a flowchart illustrating a method for processing handover in a multi-mode terminal according to an embodiment of the present invention.

FIG. 3 is a flowchart illustrating a method for processing handover in a multi-mode terminal according to an embodiment of the present invention. Specifically, in FIG. 3, it is assumed that a multi-mode terminal is handed over from the LTE network to the WCDMA network. That is, it should be noted that the LTE network is a serving network and the WCDMA network is a target network.

Referring to FIG. 3, under the condition that the LTE processor is activated (i.e., when the multi-mode terminal is connected to the LTE communication network), an Internet Protocol (IP) packet transmitted from the PC to the LTE network is transmitted to the LTE processor through the LTE interface module by the PC, and the LTE processor transmits the IP packet to the LTE network through the LTE RF module (Steps S301 and S302).

In this case, if the LTE processor receives a handover message over a network (Step S303), the LTE processor transmits a handover start message to the multi-mode control module (Step S304). The multi-mode control module receives the handover start message, and transmits a packet reception interruption message to the LTE interface module so as to interrupt IP packet reception (Step S305).

After that, in order to interrupt packet transmission from the PC to the LTE processor, the LTE interface module generates a USB NACK signal in response to all IP packets transmitted from the PC (Step S306). In addition, the LTE processor transmits a handover request message to the WCDMA processor in response to a handover message (Step S307).

The WCDMA processor of a deactivated status receives a handover request message from the LTE processor, performs synchronization of a WCDMA signal for handover, and at the same time transmits a packet forwarding preparation completion message to the LTE processor (Step S308). The LTE processor having received the packet forwarding preparation completion message from the WCDMA processor copies the residual IP packets not transmitted to the LTE network after having been received from the PC, and begins to forward the copied IP packets to the WCDMA processor through the WCDMA interface module (Steps S310 to S313). In steps S310 to S313, packets may be transmitted to the WCDMA processor through the LTE interface module and the WCDMA interface module.

Differently from the packet forwarding procedure of the LTE processor, upon completion of the operation for performing synchronization with a WCDMA signal, the WCDMA processor transmits a handover completion message to a network at step S309, transmits a successful handover message to the LTE processor at step S314, and at the same time informs a multi-mode control module of handover completion at step S315. However, the LTE processor continuously performs such packet forwarding until all packets of the LTE processor are transmitted to the WCDMA processor, differently from reception of the successful handover message from the WCDMA processor.

If packet forwarding to the WCDMA processor is completed, the LTE processor informs the control module of completion of packet forwarding at step S316. Upon receiving a successful handover message from the WCDMA processor prior to the completion of such packet forwarding, the LTE processor is in a standby mode until packet forwarding is completed, and then all packets present in the LTE processor are deleted. If the LTE processor does not receive the successful handover message from the WCDMA processor, it continuously stores packets.

After the multi-mode control module receives the handover completion message from the WCDMA processor and receives a packet forwarding completion message from the LTE processor, it transmits a packet reception restart message to the LTE interface module (Step S317). Upon receiving the packet reception restart message from the multi-mode control module, the LTE interface module answers all IP packets received from the PC using a USB ACK signal (Step S318).

Therefore, all the IP packets received from the PC are transmitted to the WCDMA interface module through the LTE interface module, and the WCDMA interface module transmits the IP packets to the WCDMA processor, such that the resultant packets are transmitted to the WCDMA network using the WCDMA RF module according to a series of communication processes (Steps S319 to S321).

Figure 4:
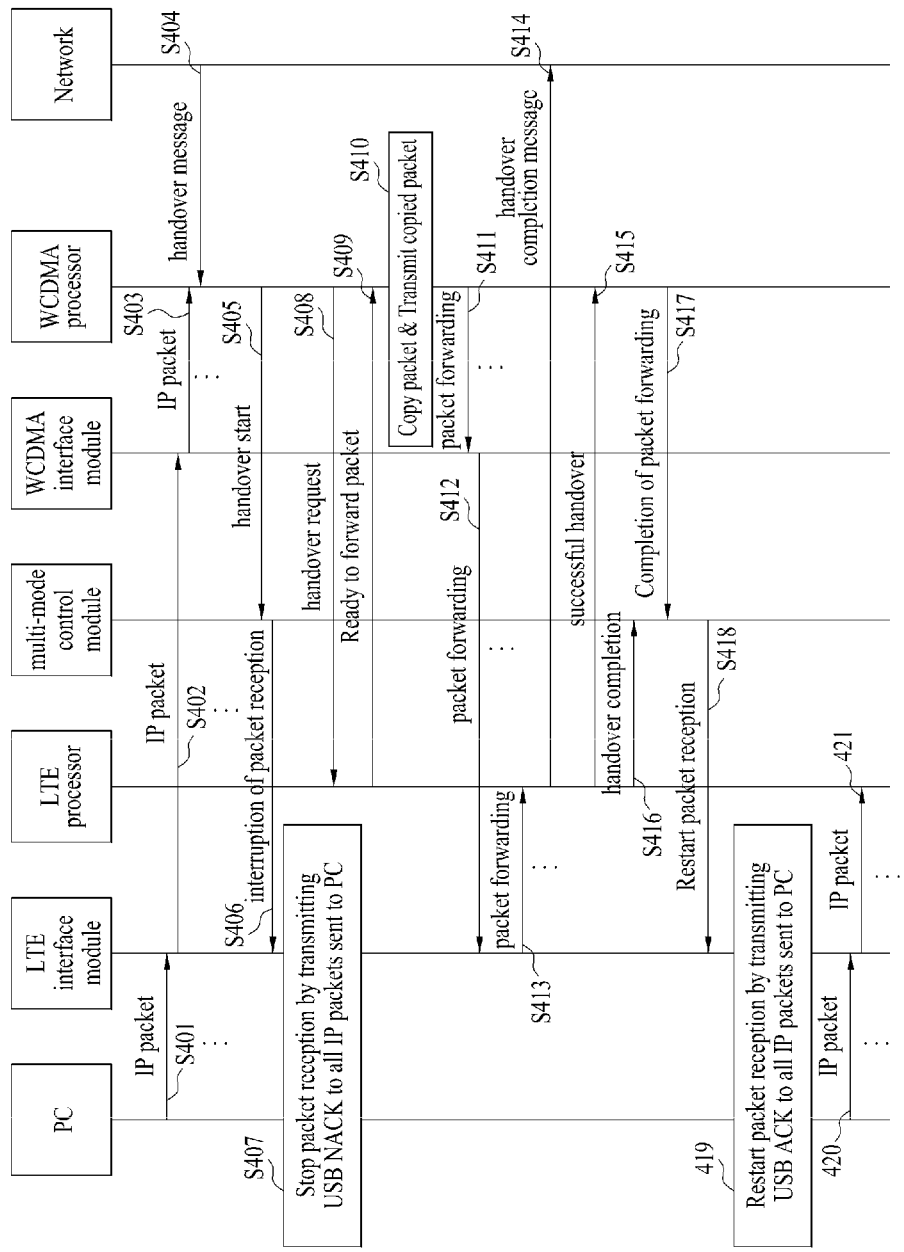
FIG. 4 is a flowchart illustrating a method for processing handover in a multi-mode terminal according to another embodiment of the present invention.

FIG. 4 is a flowchart illustrating a method for processing handover in a multi-mode terminal according to another embodiment of the present invention. Specifically, FIG. 4 assumes that a multi-mode terminal is handed over from the WCDMA network to the LTE network. That is, the WCDMA network is a serving network, and the LTE network is a target network.

Referring to FIG. 4, under the condition that the WCDMA processor is activated (i.e., when the multi-mode terminal is connected to the WCDMA processor communication network), an Internet Protocol (IP) packet transmitted from the PC to the WCDMA network is transmitted to the WCDMA interface module through the LTE interface module, the WCDMA interface module transmits the IP packet to the WCDMA processor, and the WCDMA processor transmits the IP packet to the network through the WCDMA RF module (Steps S401 to S403).

In this case, if the WCDMA processor receives a handover message over the WCDMA network (Step S404), the WCDMA processor transmits a handover start message to the multi-mode control module (Step S405). The multi-mode control module receives the handover start message, and transmits a packet reception interruption message to the LTE interface module so as to interrupt IP packet reception (Step S406).

After that, in order to interrupt packet transmission from the PC to the WCDMA processor, the LTE interface module generates a USB NACK signal in response to all IP packets transmitted from the PC (Step S407). That is, although the currently connected network is a WCDMA communication network, the PC is connected to the multi-mode terminal through the LTE interface module so that the LTE interface module of the LTE processor can transmit a USB NACK signal. In addition, the WCDMA processor transmits a handover request to the LTE processor in response to a handover message (Step S408).

The LTE processor of a deactivated status receives a handover request message from the WCDMA processor, performs synchronization of an LTE signal for handover, and at the same time transmits a packet forwarding preparation completion message to the WCDMA processor (Step S409). The WCDMA processor having received the packet forwarding preparation completion message from the LTE processor copies the residual IP packets not transmitted to the LTE network after having been received from the PC, and begins to forward the copied IP packets to the LTE processor (Steps S411 to S413). In steps S411 to S413, packets may be transmitted to the LTE processor through the WCDMA interface module and the LTE interface module.

Differently from the packet forwarding procedure of the WCDMA processor, upon completion of the operation for performing synchronization with an LTE signal, the LTE processor transmits a handover completion message to a network at step S414, transmits a successful handover message to the WCDMA processor at step S415, and at the same time informs a multi-mode control module of handover completion at step S416. However, the WCDMA processor continuously performs such packet forwarding until all packets of the WCDMA processor are transmitted to the LTE processor, differently from reception of the successful handover message from the LTE processor.

If packet forwarding to the LTE processor is completed, the WCDMA processor informs the control module of completion of packet forwarding at step S417. Upon receiving a successful handover message from the LTE processor prior to the completion of such packet forwarding, the WCDMA processor is in a standby mode until packet forwarding is completed, and then all packets present in the WCDMA processor are deleted. If the WCDMA processor does not receive the successful handover message from the LTE processor, it continuously stores packets.

After the multi-mode control module receives the handover completion message from the LTE processor and receives a packet forwarding completion message from the WCDMA processor, it transmits a packet reception restart message to the LTE interface module (Step S418). Upon receiving the packet reception restart message, the LTE interface module answers all IP packets received from the PC using a USB ACK signal (Step S419).

Therefore, all the IP packets received from the PC are transmitted to the LTE processor through the LTE interface module, and the resultant packets are transmitted to the LTE network using the LTE RF module according to a series of communication processes (Steps S420 to S421).

As described above, the method and apparatus for performing handover according to the embodiments of the present invention can prevent packets from being lost during handover of a dual-mode terminal, such that it can also prevent not only deterioration of Transmission Control Protocol (TCP) performance but also throughput reduction.

It will be appreciated by persons skilled in the art that the objects that can be achieved by the present invention are not limited to what has been particularly described hereinabove and the above and other objects that the present invention can achieve will be more clearly understood from the following detailed description taken in conjunction with the accompanying drawings.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicit cited relation in the appended claims or may include new claims by amendment after application.

The above-mentioned embodiments of the present invention have been disclosed on the basis of a data communication relationship between a base station and a terminal. Specific operations to be conducted by the base station in the present invention may also be conducted by an upper node of the base station as necessary. In other words, it will be obvious to those skilled in the art that various operations for enabling the base station to communicate with a terminal in a network composed of several network nodes including the base station will be conducted by the base station or other network nodes other than the base station. The term 'Base Station' may be replaced with the term 'fixed station', 'Node-B', 'eNode-B (eNB)', or access point as necessary. The term 'terminal' may be replaced with the term 'user equipment (UE)', 'mobile station (MS)' or 'mobile subscriber station (MSS)' as necessary.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of claims, and all modifications within equivalent ranges of the present invention are contained in the scope of the present invention.

As apparent from the above description, the exemplary embodiments of the present invention have the following effects. The method and apparatus for performing handover according to the embodiments of the present invention can prevent packet from being lost during handover of a multi-mode terminal, such that it can also prevent not only deterioration of Transmission Control Protocol (TCP) performance but also throughput reduction.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for performing handover in a dual-mode terminal, the method comprising:
    receiving an Internet Protocol (IP) packet from a personal computer (PC), and transmitting the received IP packet to a serving network;
    upon receiving a handover message from the serving network, stopping reception of the IP packet from the PC;
    forwarding residual packets from a first processor corresponding to the serving network to a second processor corresponding to a target network;
    upon handover completion and completion of the forwarding of the residual packets, restarting reception of the IP packet from the PC; and
    transmitting the residual packets to the target network,
    wherein the PC and the dual-mode terminal are connected to each other through a Universal Serial Bus (USB) interface coupled to a Long Term Evolution (LTE) interface module,
    wherein stopping the receiving of the IP packet comprises transmitting a USB negative acknowledgement (NACK) signal, by the LTE interface module, in response to a signal received from the PC, and
    wherein a communication scheme of the serving network is different from a communication scheme of the target network.

2. The method according to claim 1, wherein stopping the receiving of the IP packet further comprises storing the residual packets in the first processor.

3. The method according to claim 1, wherein restarting the receiving of the IP packet comprises transmitting a USB acknowledgement (ACK) signal in response to the signal received from the PC.

4. The method according to claim 1, wherein restarting the receiving of the IP packet reception comprises:
    if handover is completed before completion of the forwarding of the residual packets, entering a standby mode until the forwarding of the residual packets is completed, and deleting the residual packets stored in the first processor.

5. The multi-mode terminal according to claim 4, wherein the first processor stores the residual packets if the reception of the IP packet from the PC is stopped.

6. A multi-mode terminal, comprising:
    a first processor for communicating with a serving network;
    a second processor for communicating with a target network; and
    a multi-mode control module for controlling transmission and reception of an Internet Protocol (IP) packet among a personal computer (PC), the first processor and the second processor,
    wherein:
    the multi-mode control module, upon receiving a handover message from the serving network, stops reception of the IP packet from the PC;
    the first processor forwards residual packets to the second processor;
    the multi-mode control module, upon handover completion and completion of the forwarding of the residual packets, restarts reception of the IP packet from the PC;
    the PC and the multi-mode terminal are connected to each other through a Universal Serial Bus (USB) interface coupled to a Long Term Evolution (LTE) interface module;
    stopping the reception of the IP packet comprises transmitting a USB negative acknowledgement (NACK) signal, by the LTE interface module, in response to a signal received from the PC; and
    a communication scheme of the serving network is different from a communication scheme of the target network.

7. The multi-mode terminal according to claim 6, wherein the multi-mode control module transmits a USB acknowledgement (ACK) signal in response to the signal received from the PC so as to restart the IP packet reception.

* * * * *